United States Patent
Glaschick

Patent Number: 5,323,146
Date of Patent: Jun. 21, 1994

[54] METHOD FOR AUTHENTICATING THE USER OF A DATA STATION CONNECTED TO A COMPUTER SYSTEM

[75] Inventor: Rainer Glaschick, Paderborn, Fed. Rep. of Germany

[73] Assignee: Siemens Nixdorf Informationssysteme AG, Paderborn, Fed. Rep. of Germany

[21] Appl. No.: 773,602
[22] PCT Filed: Mar. 20, 1991
[86] PCT No.: PCT/EP91/00542
§ 371 Date: Jul. 31, 1992
§ 102(e) Date: Jul. 31, 1992
[87] PCT Pub. No.: WO91/14980
PCT Pub. Date: Oct. 3, 1991

[30] Foreign Application Priority Data

Mar. 20, 1990 [DE] Fed. Rep. of Germany ......... 400897

[51] Int. Cl.$^5$ .................... G06F 12/14; G06F 7/58; H04K 1/02
[52] U.S. Cl. .................... 340/825.34; 364/DIG. 1; 364/222.5; 364/286.5; 364/260.4; 364/261; 364/918.7; 395/575; 395/725
[58] Field of Search .............. 235/382; 380/3, 4, 23, 380/25; 395/700, 725, 575; 340/825.34, 825.31

[56] References Cited

U.S. PATENT DOCUMENTS

| | | |
|---|---|---|
| 4,200,770 | 4/1980 | Hellman et al. .............. 178/22 |
| 4,424,414 | 1/1984 | Hellman et al. ............ 178/22.11 |
| 4,549,075 | 10/1985 | Saada ...................... 235/380 |
| 4,596,898 | 6/1986 | Pemmaraju ................ 178/22.16 |
| 4,630,201 | 12/1986 | White ....................... 364/408 |
| 4,797,920 | 1/1989 | Stein ......................... 380/24 |
| 4,995,081 | 2/1991 | Leighton et al. ............... 380/23 |
| 5,120,939 | 6/1992 | Claus et al. ................. 235/382 |
| 5,148,007 | 9/1992 | Kruse ....................... 235/382 |
| 5,208,447 | 5/1993 | Kruse ....................... 235/380 |

OTHER PUBLICATIONS

Diffie, W., & Hellmann, M. E., New Directions in Cryptography, IEEE Transactions on Information Theory, vol. IT-22, No. 6, Nov. 1976 pp., 135-145.
Mark, T.; Lomas, A.; & Gong L., Reducing Risks from Poorly Chosen Keys, ACM SIGOPS Review, Dec. 89, vol. 23, pp. 14 to 18.

Primary Examiner—Eddie P. Chan
Attorney, Agent, or Firm—McCormick, Paulding & Huber

[57] ABSTRACT

In a process for authenticating a user using a data station (16) in relation to a computer system (14) connected to the data station (16), a first value z is determined in the computer system (14) from an identification word (u) stored for the user in the computer system and a random number r generated in the computer system, and a second value y is determined in the computer system (14) from the password a given by the user and the random number r. The password a is encoded before being sent to the computer system (14) and coded there by a one-way function (30). As a result of these measures, the password a does not appear in the clear text at any point in the data transmission.

13 Claims, 5 Drawing Sheets

METHOD FOR AUTHENTICATING THE USER OF A DATA STATION CONNECTED TO A COMPUTER SYSTEM

FIELD OF THE INVENTION

The invention concerns a method for authenticating the user of a data station connected to a computer system.

BACKGROUND OF THE INVENTION

The inventive method is concerned very generally with the problem of authentication in computer systems which are connected with a plurality of data stations. The data stations can be computers with programs, personal computers or dedicated data stations. As soon as a user or subscriber wants to make connection with a computer through his data station he will be required by the computer to authenticate himself by a password. He transmits the password to the data station which passes it as information to the computer. The involved problem is that an unauthorized user can so modify his data station that he receives a copy of the information sent from the first data station to the computer and withdraws it from the data station. Thereafter the unauthorized user can be authenticated in place of the authorized user because he knows the password. A further problem of this type of authentication resides in that a privileged user who has unlimited access to the data in the computer can acquire the password of a user by reading it from the memory.

In a first known authentication method, in the password announcement the unencoded password is transmitted from the data station of the user to the computer system. There the password is encoded by means of a one-way function and stored in a data file. In usage of the password, that is in the authentication, the password sent in clear text from the data station to the computer system is likewise encoded in the computer system by a one-way function. By "one-way function" is meant a function which is easy to calculate but for which no method exists for calculating its reverse function at reasonable expense.

The resulting value is subsequently compared with the encoded password stored in the data file. Upon identity the user is taken as authenticated. In this method it is not possible to gain knowledge of the password by reading out the password data file. However, the password transmitted in clear text to the computer system can be tapped and subsequently improperly used.

An improvement can be achieved if the authentication takes place in a dialog between the data station and the computer system. In connection with this it has already been proposed to provide a symmetrical ciphering process. In it in the announcement of the password 20 the password is stored in a protected data file in clear text. For authentication a random number is created in the computer system by a random number generator, which random number is encoded by an encoding unit and sent to the data station. This information is decoded in a decoder with the password submitted by the user, is modified by an addition, encoded with the password by the encoder, and returned to the computer system. In the computer system the information is decoded by a decoder and compared with the random number likewise modified by the addition, which must result in equality using a comparator. A disadvantage of this solution is likewise that the password is obtainable by a privileged user, such as a system manager or equipment technician, who can read out the corresponding data file. Therefore in this case the password can also be stolen Finally, a method has also been developed that requires the storage of at least two values from the user. These keys are created by a keying central unit according to a given method and are not freely selectable by the user, so that the user cannot choose a mnemonic password as in customary password systems. Since the user for security reasons is not permitted to write down the password, this method is practical only in connection with chip cards.

The invention has as its object the provision of a method of the previously mentioned type which offers higher security with simple handling.

SUMMARY OF THE INVENTION

This object is solved with a method wherein the password is never sent in clear text over the connecting lines between the data station and the computer system. It can therefore not be tapped and improperly used.

An increased security is obtained in that the random number before its transmission to the data station is encoded with a one-way function. In order to provide a single way to create values under the previously described assumptions in the computer system and in the data station, which values can be compared with one another, it is provided that commutative one-way functions are used for encoding the password and for combining the encoded value with the random number in the computer system on one side and for encoding the random number and for its combination with the encoded password in the data station on the other side, as is explained hereinafter in further detail.

The combining and/or encoding steps by means of one-way functions can also be repeated at least one time.

To be secure against the emulation of a computer system (in place of the actually provided computer system), the method can be expanded on both sides of the authentication so that the different method steps in the computer system and in the data station run simultaneously in nested fashion.

Another extension is characterized in that the computer system encodes a password h and transmits the results v to the data station, where it is encoded with a random number s formed in the data station to a value $v^s$ that the random number s is encoded and transmitted to the computer system, that from the encoded random number p and the password h of the computer system an encoded value q is formed which is transmitted to the data station and in that the relationship of the two values q and $v^s$ is evaluated. By this expansion an authentication of the computer system is also achieved. For determining the authenticity a comparison of the transmitted encoded values with the self-ascertained values is carried out both on the computer side and on the user side. Also in this reciprocal authentication at no moment can the secret password by tapped since it does not appear in clear text on the data connections.

A further development of the previous embodiment is characterized in that the transmission of the encoded random numbers x, p takes place with the transmission of an identifying value. Before the data communication between the computer system and the user takes place each side informs itself by reference to previously exchanged lists whether the instant identification value is registered. If the test turns out positive the data exchange can be carried out. By means of these measures the security of the data transaction is still further increased.

There exists also the possibility of not storing in the computer system the value created by the encoding of the password in the announcement, the so-called authenticator, but to transmit it to the computer system together with the identification, so that the authenticator is verified by a signature process of a type known in itself. Therefore every attempt to gain the authenticator by reading out the corresponding data in the computer system, and from these circumstances to gain the password, is thwarted.

The operations with the encoding functions can take place in a sealed unit in which the secret key resides and from which it cannot be read out. Only the authenticator is readable in this case electronically or optically. One such unit can for example by formed as a chip card.

As a one-way function there can for example be used a discrete exponentiation modulo an integral number or a polynomial expansion of a number ring. The mathematical bases for this are known in themselves. With them the calculations are executed modulo a large prime number q, so that only the numbers from zero to this large number q appear. To this modulo a further number w is determined which is the primitive element of the Galois-field GF (q). This means that the exponents $w^i$ are all different from w, so long as i is smaller than q. Since q is a prime number each number w q is a primitive element.

Alternatively to this the calculating method can use polynomial arithmetic modulo to an irreducible polynomial of degree n. Advantages and disadvantages are sufficiently discussed in the literature and are not the subject of the present invention.

Under these edge conditions the function $f(x,y)=x^y$ is simple to calculate, but the inverse function $f^{-1}(x,z)=\log_x z$ is only calculatable with large computing effort. For q approximately $2^{200}$ the exponentiation requires about 200 multiplications (of 200-bit values). The best known method of logarithmic formation however requires $10^9$ multiplications. This defines the property of a one-way function. Because $f(f(x,y),z)=(x^y)^z=x^{(y\,z)}=(x^z)^y=f(f(x,z),y)$ the exponentiation is right-commutative.

BRIEF DESCRIPTION OF THE DRAWINGS

The following description explains in connection with the accompanying drawings the invention by way of exemplary embodiments. They show.

DESCRIPTION OF THE PREFERRED EMBODIMENTS

Figure 1:
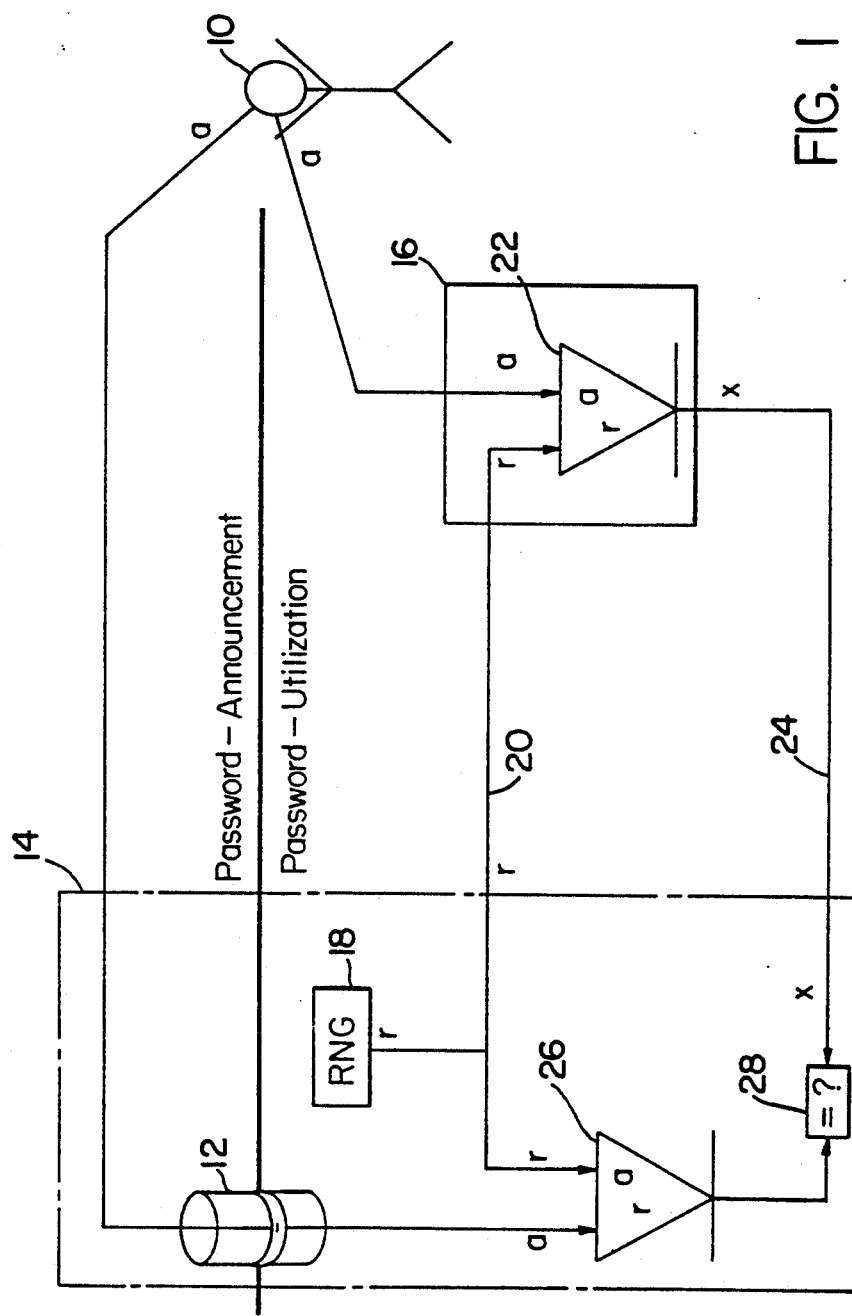
FIG. 1—An operating schematic of the method according to the invention by way of a first embodiment.

The method illustrated in FIG. 1 is intended to hinder the eavesdropping of the password during an authentication procedure. In it a distinction is made between the password announcement, a one-time procedure, and the utilization of the password or authentication, a desirably repeatable process. In the password announcement the selected password from the user 10 is entered into a confidential file 12 of a computer 14 over a protected channel, for example by a messenger. If the user subsequently wants to call up a service of the computer 14 over one of the data stations connected with it his connection privilege is examined (authentication). This takes place in such way that in a random generator 18 a random number r is formed in which for example the time of day is multiplied with the process sequence number. This random number r is transmitted over a channel 20 to the data station 16. At the data station, after request for the password a, in the function generator 22 the two position one-way function "modular exponentiation" is realized by forming the value $x=r^a$. This value x is conveyed back to the computer 14 over a channel 24. In the computer 14, simultaneously with the process in the data station 16, through usage of the password a stored in the data file 12 and the random number r the value $r^a$ is formed by a function computer 26. This value and the value x are compared with one another in a comparator 28. In the event of identity the user is taken as validly authenticated. Because of the one-way characteristic of the modular exponentiation the password cannot be ascertained with acceptable expense from the data transmitted over the channels 20 and 24. Thus the password a can not be ascertained by tapping the connection between the data station 16 and the computer 14. However, the password is stored in the computer 14 for access by a privileged user.

Figure 2:
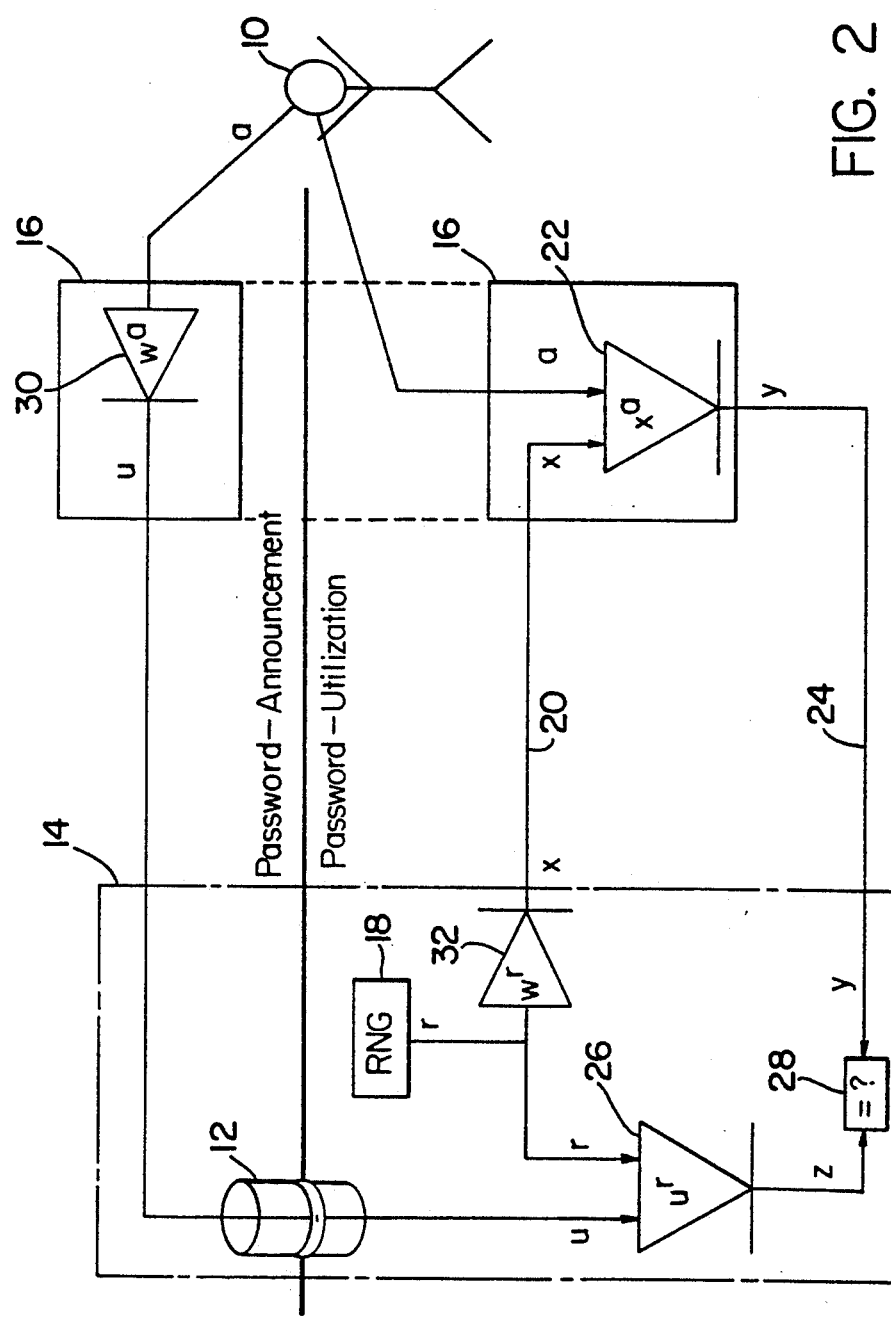
FIG. 2—An operating schematic of the inventive method by way of a second embodiment.

To also eliminate this source of misuse the method is expanded according to FIG. 2. Similar parts are again given the same reference numbers. In contrast to the solution according to FIG. 1 the password in the password announcement is encoded in the data station 16 by means of a function computer 30 performing a one-way function whereby the authentication or value $u=w^a$ is calculated. This authentication value u which contains the password a only in an encoded form, is conveyed to the computer 14 and stored in its data file 12.

Further, in the authentication procedure the random number r is encoded in a function computer 32 before its transmission to the data station 16, where the value $x=w^r$ is calculated. This encoded value x is transmitted over the channel 20 to the data station 16.

Then in the authentication procedure the value $z=u^r=w^{a\,r}$ is formed in the function computer 26 of the computer 14. The value $y=x^a=w^{r\,a}=w^{a\,r}$ is formed in the function computer 22 of the data station 16. It will be understood that despite the different calculation paths the values z and y are identical. In the case of identity of the values y and z the user is again taken as authenticated. In the method according to FIG. 2 neither during the password announcement nor during the password utilization is it possible by tapping the channels between the data station 16 and the computer 14 to ascertain the password a. Also, knowledge of the contents of the data file 12 does not lead to knowledge of the password a. The authenticator u and the value w can be known. Nevertheless, it is not possible with reasonable expense to ascertain the password a.

The calculations of the data station can be entirely realized by a chip card so that the user need not confide his password to a machine over which he has no influence and which can be manipulated.

In order to be protected against the simulation of a computer system the method can easily be expanded to reciprocal authentication wherein the two processes run simultaneously and the momentary communication blocks carry the information of both processes. The number of communication steps between the computer and the data station is therefore not increased.

Figure 3:
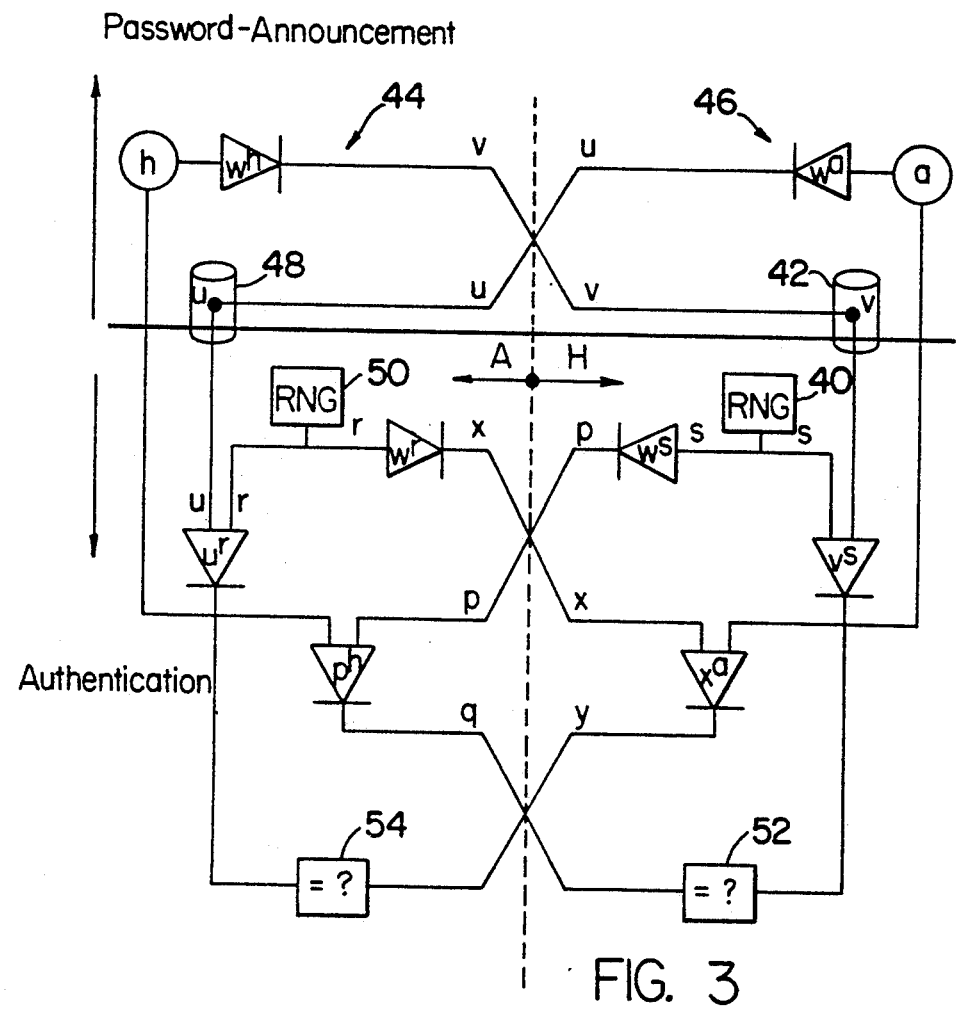
FIG. 3—A schematic representation of the procedure in which the computer system is also authenticated.
Figure 4:
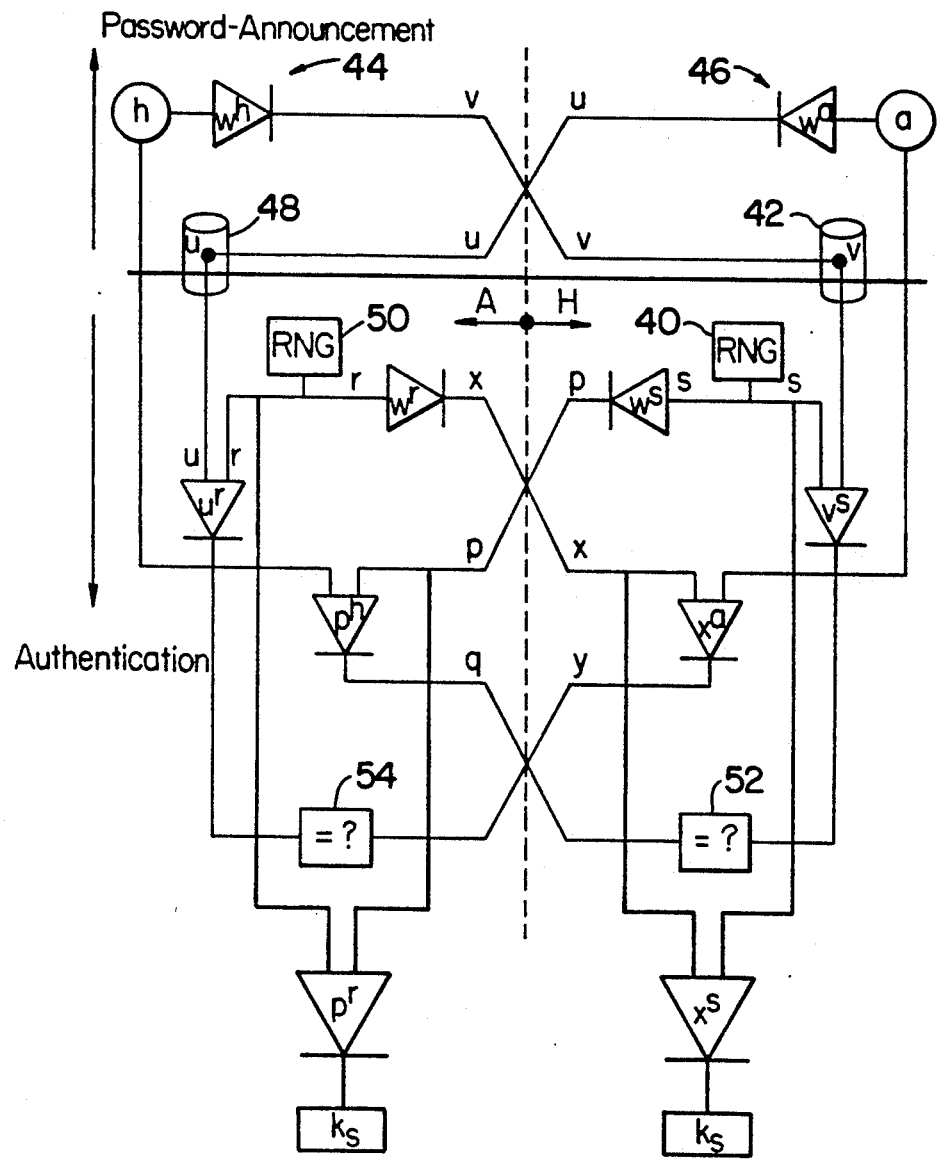
FIG. 4—A program schematic according to FIG. 3 in which on both the side of the computer and of the user a session key is formed for authentication.

In this embodiment, whose procedural method is schematically illustrated in FIG. 3, a first computer 44, designated as "host" hereinafter, selects a secret password h. The second computer provided for the communication, referred to hereinafter as "user" 46, selects the secret password a. During the preparatory phase the user 46 forms by application of a one-way function the non-secret key $u = w^a$. The non-secret key u is subsequently conveyed to the host 44. Likewise, the host by application of a one-way function forms the non-secret key $v = w^h$. Subsequently the non-secret key v is transmitted from the host 44 to the user 46. The transmitted key v is stored on the user side in a predetermined data area 48 and the transmitted key u is stored on the host side in a predetermined data area 42.

In the following the reciprocal authentication is described. First, both the host 44 and the user 46 form a random number in a random number generator 50 or 40. In accordance with the example of FIG. 3, on the side of the host 44 the random number is the number r, and on the side of the user 46 the random number is the number s. The random number s is encoded to the value $p = w^s$ using a one-way function. Subsequently this value p together with an identification A is transmitted to the host 44. An analog of this is carried out in the host 44. It, using the one-way function forms the value $x = w^r$ and transmits this value together with an identification H to the user 46.

Each side now uses on its received value x or p its secret password a or h. This means on the user side that the value $y = x^a$ is formed, and this value is transmitted back to the host 44. The host forms the value $q = p^h$ and sends the value q to the user. On the user side a test is now made in a comparator block 52 of whether the value q is identical to the value $v^s$. On the side of the host computer a test is made in another comparator block 54 of whether the value y is identical to the value $u^r$. If these mentioned values agree with one another the host 44 and the user 46 are clearly authenticated.

To secure authentication of subsequent communications, for example through the use of a symmetrical method such as the known DES-method, the use of a session key is necessary. One such key can, for example, be formed in accordance with the method of Diffie and Hellmann. A disadvantage of these known methods however is that an intruder during the moment of waiting for authentication can through an active intervention influence the formation of the key to his own benefit. In the following a method will be described which avoids this disadvantage and builds onto the method described in connection with FIG. 3. In this method a session key is created from the already exchanged data so that it cannot be ascertained by an intruder.

The course of the formation of a session key is schematically illustrated in FIG. 6 by building onto the method steps which have already been explained in connection with FIG. 3. Similar parts are similarly designated in these figures. The host 44 forms from the values r and p, using a one-way function, the value $k_s = p^r = w^{sr}$. In an analogous way the user 46 forms from the values x and s the value $k_s = x^s = w^{rs}$. The values $k_s$ formed on both sides clearly agree with one another. They can be used for encoding the communication. An intruder is not able to ascertain this session key either by eavesdropping the data connection between the user 46 and the host 44 or by an active intervention on the user side or on the side of the host 44.

Figure 5:
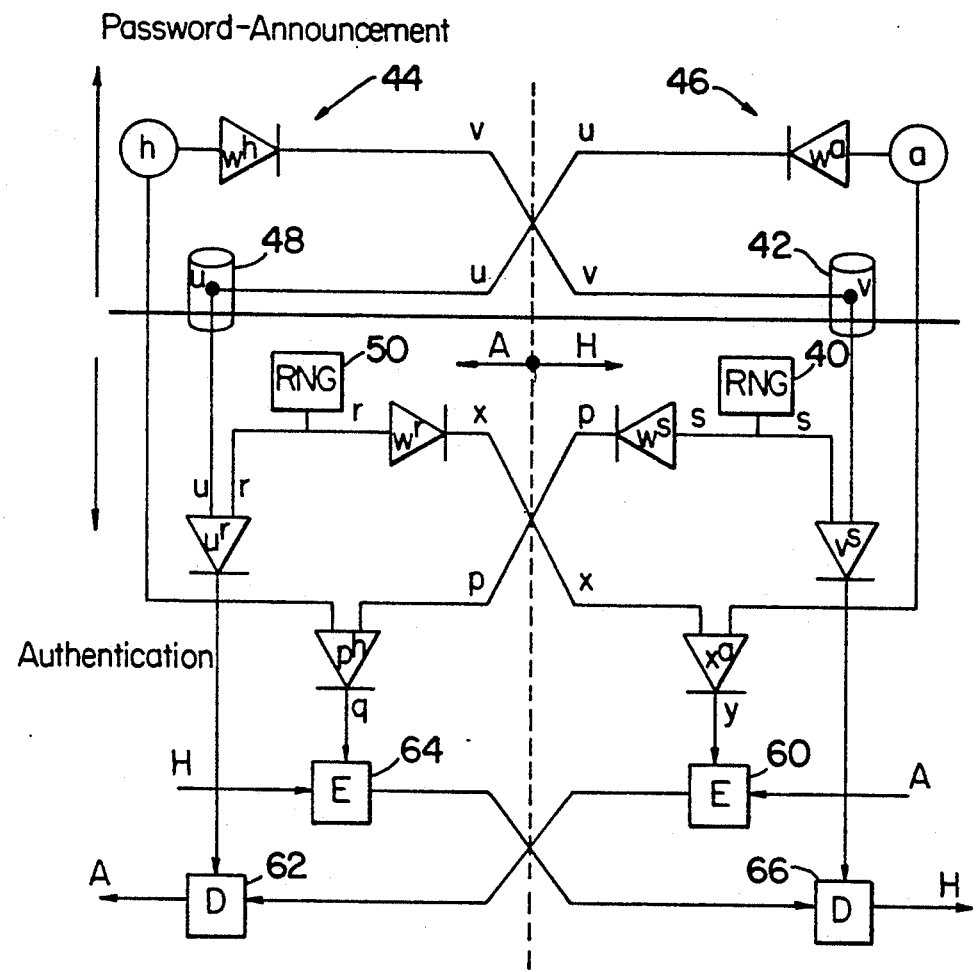
FIG. 5—A program schematic in which the session key is formed according to the DES-method.

If it is known that in the communication between the host 44 and the user 46 a session encoding should be used for the purpose of authentication, the previously described method can be further simplified. In FIG. 5 such an expansion is schematically illustrated. The starting point for the steps illustrated in FIG. 5 is the method already described in connection with FIG. 3. The references of FIG. 3 are maintained. In the method of FIG. 5 the values q and y are not directly conveyed to the other sides, but are used as keys for the symmetrical session encoding.

The symmetrical encoding takes place on the side of the user computer 46 in the encoder 60 in accordance with the DES-method. As input values for the encoding there taking place the key value y is used and for the identification of the computer user 46 its name A is used. The result of the encoding is sent at the host 44 to the decoding block 62. There, using the value $u^r$ the decoding of the transmitted results takes place and the value A, that is the identification of the user 46, is recaptured. The host then compares this value A with values known to it contained in an identification list and determines the authenticity of the user 46.

In an analogous way the authenticity of the host is determined on the user side. In encoder 64 the encoded value q is encoded with the host identification H according to the DES-method and the results are sent to the decoder block 66 on the user side. This decoder decodes the information sent to it using the encoded value $v^s$ and recaptures the host identification H. In this method the keys appear at no moment in clear text on the data conductors, so that the employed session key remains secret to outsiders.

During the preparatory phase, in which the user 46 transmits the value u to the host 44 and which stores it there, in a further expansion the value pair, consisting of the name A and the password a can be transmitted with a digitally provided signature, for example according to the scheme of El Gamal, which is described in "A Public Key Cryptosystem and a Signature Scheme Based on Discrete Logarithms", IEEE-IT 31 (1985), Pages 469–472. In the authentication the user sends together with its name A also the certified package (A, a) cert. This method variation is useful if a user communicates with several different computer systems. Then the authenticator is sealed by an admissions authorizer.

What is claimed is:

1. A computer implemented method for authenticating the user of a data station (16) connected to a computer system (14), said method comprising the steps of encoding a password a inputted from the user by a one-way function generator (30) to form an authentication word u, transmitting said word u to said computer system (14) for storage therein, in response to said authentication word u stored in said computer system (14) for the user and a random number r generated in the computer system by means of a function generator (26) generating a first value z as a function of u and r, generating a word x by encoding said random number r by a one-way function generator (32) in said computer system (14), transmitting said word x to said data station (16), in the data station (16) in response to said password a input from the user and said word x generating a second value y by a one-way function generator (22), transmitting the value y to the computer system (14), and in the computer system (14) evaluating the relationship of the two values z and y to one another for authenticating the user of the data station (16).

2. A method according to claim 1 further characterized by using commutative one-way functions to encode the password a by said function generator (30) to form said word u, to combine said word u with said random number r in said function generator (26), to encode said random number r by said function generator (32), and to combine the encoded random number r with the unencoded password a in said function generator (22).

3. A method according to claim 1 further characterized in that as a one-way function the discrete exponentiation modulo function with an integer value or a polynomial expansion of a number ring is used.

4. A method according to claim 1 further characterized by carrying out a reciprocal authentication of said data station and computer system by, in addition to authenticating said password a input from a user to said data station by the steps of claim 1, also authenticating a password h input from said computer system by using the steps of claim 1 with said data station and said computer system having roles reversed from those of claim 1, the steps of claim 1 and the steps of said reciprocal authentication of said password h being run nestedly simultaneously.

5. A method according to claim 4 further characterized by the carrying out of said authentication of said password h including the steps of encoding said password h in said computer system to produce a result v, transmitting said result v to said data station and encoding it there with a random number s formed in the data station (46) to produce a value $v^s$, encoding the random number s in said data station to produce the result p, transmitting p to the computer system (44), in the computer system forming from the encoded random number p and the password h an encoded value q, transmitting the value q to the data station (46), and evaluating in said data station the relationship of the two values q and $v^s$ with respect to one another.

6. A method according to claim 5, further characterized in that for the encoding one-way functions are used.

7. A method according to claim 5 further characterized in that the transmitting of the values x, p each takes place with the accompanying transmission of an identification value (H or A).

8. A method according to claim 5 further characterized by forming by a one-way function in the computer system (44) from the random number r and the encoded random number p transmitted from the data station (46) an encoded value $k_s = p^r$, and using said value $k_s = p^r$ as a session key.

9. A method according to claim 8 further characterized by forming by a one-way function in the data station (46) from the random number s and from the encoded random number x transmitted from the computer system (44) an encoded value $k_s = x^s$, and using said value $k_s = x^s$ as a session key.

10. A method according to claim 5 further characterized in that the second value y is used to encrypt a user identification A according to the DES-method and in the computer system (44) decrypting it using said first value z, and that the encoded value q of the computer system (44) is used to encrypt a computer system identification H according to the DES-method, and in the data station (46) decrypting said encrypted value H using the value $v^s$.

11. A method according to claim 1 further characterized by transmitting said authentication word u to the computer system (14) simultaneously with an identification value A, and verifying said word u through a signature process.

12. A method according to claim 1 further characterized in that the encoding processes take place in a sealed unit (chip card), in which the secret key (password) resides in a non-read outable way, with said authentication word u being readable solely electronically or optically.

13. A method as defined by claim 1 further characterized by having said function generator (26) generate the function $z = u^r$, by having said function generator (30) generate the function $u = w^a$, by having the function generator (32) generate the function $x = w^r$, and by having the function generator (32) generate the function $y = x^a$.

* * * * *